United States Patent [19]

Olson

[11] 4,086,534

[45] Apr. 25, 1978

[54] CIRCUIT FOR WIRE TRANSMISSION OF HIGH FREQUENCY DATA COMMUNICATION PULSE SIGNALS

[75] Inventor: Gerald R. Olson, Forest Lake Township, Minn.

[73] Assignee: Network Systems Corporation, Brooklyn Center, Minn.

[21] Appl. No.: 768,226

[22] Filed: Feb. 14, 1977

[51] Int. Cl.² .................................................. H04B 1/38
[52] U.S. Cl. ........................................ 325/15; 325/23; 333/17 R; 333/24 R; 333/29
[58] Field of Search ................ 325/21, 22, 23, 15; 178/58 R, 58 A, 59, 63 R, 63 A, 63 B, 63 C, 68; 179/15 AL, 2 C; 333/17, 24, 29, 32; 343/175, 180

[56] References Cited

U.S. PATENT DOCUMENTS

| | | | |
|---|---|---|---|
| 3,516,065 | 6/1970 | Bolt | 178/68 |
| 3,585,595 | 6/1971 | Slavin | 179/15 AL |
| 3,632,881 | 1/1972 | Graham | 179/15 AL |
| 3,744,051 | 7/1973 | Sanders | 178/68 |
| 3,786,419 | 1/1974 | Nick | 178/68 |
| 3,851,098 | 11/1974 | Pingault | 178/68 |
| 3,949,168 | 4/1976 | Taub | 178/68 |
| 3,993,867 | 11/1976 | Blood | 178/58 R |

*Primary Examiner*—Robert L. Griffin
*Assistant Examiner*—Michael A. Masinick
*Attorney, Agent, or Firm*—Jacobson and Johnson

[57] ABSTRACT

A transceiver (transmitter-receiver) for high frequency data pulse signals is connected to a coaxial cable transmission line through a distributed delay line which has an impedance equal in value to the characteristic impedance of the coaxial cable transmission line. The transceiver transmitting and receiving circuits are tapped into the transmission line and form a part of the distributed delay line. When not in the transmitting mode, the transmitter circuit appears as a reactive element of the distributed delay line and thereby introduces minimum loss or reflection into the transmission line. The transmission line can serve as a trunk line for a number of transceivers by permitting virtually unrestricted multi-point connections to the line.

8 Claims, 2 Drawing Figures

4,086,534

CIRCUIT FOR WIRE TRANSMISSION OF HIGH FREQUENCY DATA COMMUNICATION PULSE SIGNALS

BACKGROUND OF THE INVENTION

1. Field of the Invention

This invention is intended for use for high speed data pulse communications via coaxial cable. It is for use in applications where high data transmission rates must be reliably transmitted over intermediate distances and is particularly adaptable for use in computer system installations. It is used to interconnect transceivers to enable selective transfer of digital data at high data transmission rates between transceivers.

2. Description of the Prior Art

In one sense, this invention can be considered somewhat analogous to digital modems which are used for data communication over telephone lines. However, the difficulties with the latter are in the power losses and the relatively slow speeds at which the data is transferred. The prior art also includes coaxial cable data channel connections between units in a computer system. In those cases, the data rates have been somewhat limited and, even more importantly, it has permitted only a point-to-point connection, i.e., limited to two-connection with a separate coaxial cable being needed to transmit digital data information between each two units. Past efforts at implementing multipoint transmission lines of this type have met with only partial success because of the severe loading and distortion introduced when adding more than two transceivers to the coaxial cable.

SUMMARY OF THE INVENTION

A transceiver for very high data pulse transmission rates is connected into a coaxial cable transmission line by a series of inductances having values and arranged to combine with distributed capacitance to form a delay line having an impedance equal to the characteristic impedance of the coaxial cable so that the connection introduces minimum loss, distortion and reflection into the line. The switching network in the transceiver, for selectively setting it to the transmitting mode, and the receiver are tapped into the coaxial cable transmission line through the delay line so that the cable at all times sees only its characteristic impedance. The characteristic impedance introduced by the connection of the transceiver into the coaxial cable does not produce any discontinuity nor cause any reflections to occur on the coaxial cable transmission line and permits the transceiver circuits to be tapped into the cable without introducing substantial loss. Therefore, a number of transceivers can be inserted into the coaxial cable transmission line at various locations along the line without substantially affecting the quality of the data pulse signals being transmitted. In this fashion, a single coaxial cable serves as a trunk transmission line to enable virtually unlimited number of transceivers to communicate with one another.

DESCRIPTION OF THE PREFERRED EMBODIMENT

A single coaxial cable transmission line 10 can serve as a trunk line for interconnecting a plurality of transceivers 11. This is distinguished from the prior art coaxial cable transmission lines for communication of high speed pulse data communications which had previously been done point-to-point with a single transceiver on each end of the coaxial cable transmission line.

Figure 1:
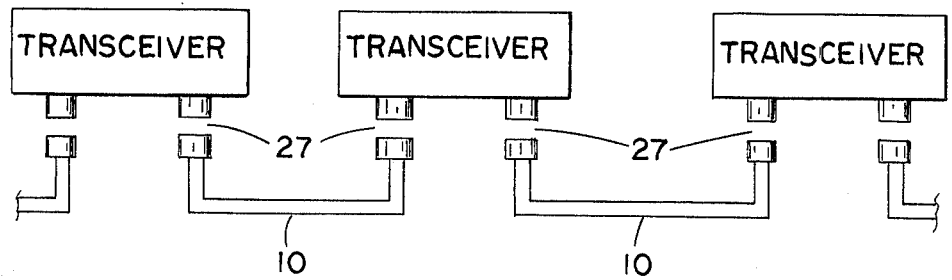
FIG. 1 illustrates in block form the manner in which a number of transceivers are connected into a single coaxial cable trunk line under the teachings of the instant invention.
Figure 2:
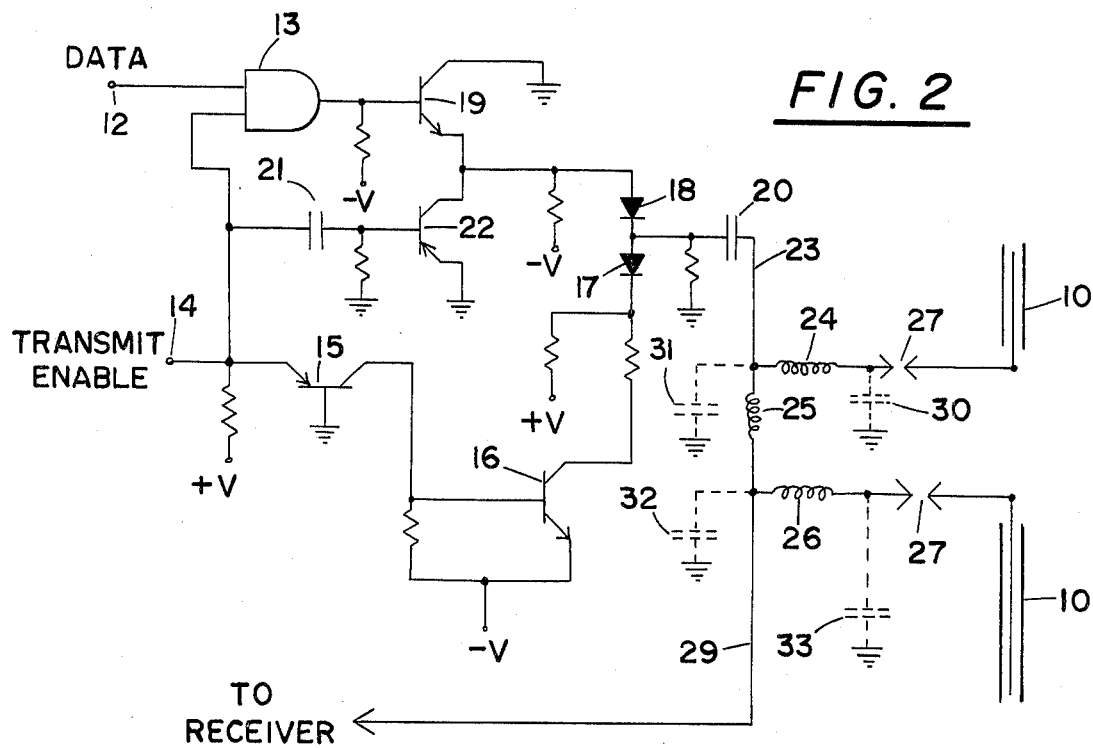
FIG. 2 illustrates in schematic form a preferred embodiment of a circuit for connecting a transceiver into the coaxial cable transmission line.

Referring now to FIG. 2, digital data in high frequency pulse form is fed from a transmitter or data generator, not shown, to terminal 12 into AND gate 13. A transmit enable signal, which may be in the form of a DC voltage level, constitutes the other input to gate 13 from terminal 14. Gate 13 and the remainder of the electrical circuit can be designed to operate in response to either negative or positive level or going signals but in this instance, and for descriptive purposes only, it is assumed that gate 13 is enabled by a negative level signal. Transistors 15 and 16 are normally in the off condition which results in diodes 17 and 18 being back-biased to the non-conducting condition. When it is desired to permit the transmission of data, the transmit enable signal on terminal 14 goes negative causing transistors 15 and 16 to conduct to remove the back-bias from diodes 17 and 18. Concurrently, gate 13 is enabled so that the data pulses can then pass through gate 13 to transistor 19 through diode 18 and capacitor 20 along conductor 23 to the junction of inductances 24 and 25 and then to the output line in a manner which will be described. Typically, the data pulses may range, for example, from 50 megacycles or megabits per second to 1½ megabits per second. Data transmission is terminated by causing the signal level at terminal 14 to go more positive thereby disabling or removing the enabling signal from gate 13 and at the same time, cutting off the conduction of transistors 15 and 16. At the same time, the positive going signal is applied through capacitor 21 onto the base of transistor 20 for the purpose of permitting capacitor 20 to recover more rapidly than would otherwise be the case.

Inductances 24, 25 and 26 are arranged in a delay line or filter fashion. One end of inductance 24 is connected to coaxial cable 10 through a standard coax cable connector or jack 27; the other end of the inductance 24 is connected to one end of inductance 25; the other end of inductance 25 is connected to one end of inductance 26; and the other end of inductance 26 is connected through another standard coax cable connector or jack 27 to the coaxial cable 10. Line 29 connects the junction of inductances 25 and 26 to the receiver portion of the transceiver, not shown. In FIG. 2, capacitances 30, 31, 32 and 33 are illustrated in shadow line form. Capacitances 30 and 33 represent respectively, in lumped form, the distributed capacitance of coaxial cable connectors and capacitances 31 and 32 respectively represent, also in lumped form, the distributed capacitance associated with the transmitter and the receiver circuitry. Inductances 24, 25 and 26 are wire inductance components having a selected value and arranged in such a manner so that they combine with the distributed capacitances 30, 31, 32 and 33 to form a delay line, as seen by the coaxial cable 10, having an impedance which is equal to the characteristic impedance of the coaxial cable. In a typical case, the characteristic impedance of the coaxial cable is in the order of 75 ohms. At the frequencies of transmission with which the instant invention is concerned, inductances 24, 25 and 26 are chosen so that combined with the distributed capacitances 30, 31, 32 and 33, the impedance of the delay line circuit appears to the coaxial cable as 75 ohms.

In essence, this delay line arrangement for coupling the receiver and the transmitter of the transceiver to the coaxial cable is such that, in effect, the coaxial cable appears to be uninterrupted and continuous since it introduces no reflections or discontinuities. As illustrated in FIG. 2, the electrical circuit path is from one end of one section of the coaxial cable 10 through jack 27, through the delay line network and through jack 27 to one end of another section of the coaxial cable. The delay line network is then effectively in series with the coaxial cable and for all practical purposes the transmission line is one continuous uninterrupted coaxial cable. The conduction paths to the receiver and transmitter circuits of the transceiver are tapped off the transmission line by conductors 23 and 29 so that the reactive components of the transmitter and receiver circuits form part of the characteristic impedance delay line network so introduce little or no distortion or reflection into the coaxial cable transmission line.

The series inductances 24, 25 and 26 connected between the connectors 27 introduce little loss into the coaxial cable path because the values of the inductances are quite small as a result of the distributed capacitances being quite small. When the transmitter, for example, is in the off condition, the back bias of diodes 17 and 18 presents a high impedance as seen looking into the transceiver from the transmission line through conductor 23. Therefore, the transceiver introduces negligible load on the coaxial cable 10. The effect of the delay line network for making the connection to the coaxial cable transmission line is that the coaxial cable 10 appears as a single continuous transmission line being tapped off as desired for connection to a plurality of transceivers along the line and, in this fashion, the coaxial cable serves as a trunk line for virtually unlimited number of multiple transceivers which may be closely spaced along the transmission line.

Typically, the transmission line is a Beldon 8228 Coaxial Cable and the connectors 27 and 28 are standard coaxial cable connectors. Further, typically, the invention satisfactorily transmits data ranging from a rate of about 50 megabits per second over a coaxial cable transceiver line of about 500 feet in length having about 16 transceivers attached to the coaxial cable trunk line, to a rate of about 1.5 megabits per second over a coaxial cable transmission line about 3,000 feet in length having up to 64 transceivers connected to the trunk line.

No effort has been made to describe the manner in which the various transceivers are controlled or signaled to transmit or receive since this involves the operation and control of the entire computer system with which these units are used and is not pertinent to an understanding of the invention. The types and the values for the circuit components and the electrical signals are considered to be a matter of choice and can be readily determined by one of ordinary skill in the design of circuits of this nature having the benefit of the instant disclosure.

In a typical case, with no limitations thereto being intended, the distributed capacitance 31 and 32 associated respectively, with the transmitter and receiver portions of the transceiver may be in the order of about 2 picofarads each, the connector distributed capacitance 30 and 33 may be in the order of one picofarad each, and inductances 24, 25 and 26 are selected to have a value of about 10 nano henrys.

I claim:

1. Circuitry for use in wire transmission of high frequency data communication pulse signals comprising: first and second lengths of identical coaxial cable; a delay line network connecting adjacent ends of said first and second coaxial cable lengths, said delay line network comprising inductance having a value which combines with distributed capacitance to substantially equal the characteristic impedance of the coaxial cable at the frequency of the data signal; conducting means connected to said delay line network for carrying data signals on the coaxial cable to a receiver; and electrical circuit means connected to said delay line network for selectively feeding transmitted data pulse signals to the coaxial cable.

2. The circuitry as in claim 1 wherein said delay line network includes three inductances in seriatim; said receiver conducting means being connected to one junction of two of the inductances and said electrical circuit means being connected to the other junction of two of the inductances.

3. The invention as set forth in claim 1 wherein said electrical circuit means for selectively feeding transmitted data pulse signals to the coaxial cable includes: distributed capacitance; a pair of diodes having their opposite electrodes connected together; means coupling the junction of said diode electrodes to said delay line network; switching circuit means connected to the other electrode of one of said diodes for switching said one diode between conducting and non-conducting states; and means for selectively feeding data communication pulse signals to the other electrode of said other diode.

4. The invention as set forth in claim 3 wherein said electrical circuit means further includes means for switching said one diode to the conducting state only when data communication pulse signals are being fed to the electrode of said other diode.

5. For transmission of high frequency data communication pulse signals, in combination: a plurality of at least three substantially identical transceivers, each transceiver having first and second coaxial cable connectors; lengths of identical coaxial cable connected between a coaxial cable connector of one transceiver and a coaxial cable connector of another transceiver; and electrical inductance in each transceiver connected between the coaxial cable connectors in each corresponding transceiver, said inductance being of value and arranged to combine with distributed capacitance of the coaxial cable connectors and circuitry within the transceiver to form a delay line between the coaxial connectors having an impedance equal to the characteristic impedance of the coaxial cable at the frequency of the data pulse signals being transmitted, whereby the transmission path through the coaxial cable from transceiver to transceiver appears as an uninterrupted coaxial cable transmission line.

6. The invention as described in claim 5 further including electrical conducting means connected to said delay line within each transceiver for communicatively tapping into the coaxial cable transmission line.

7. The invention as in claim 6 wherein said inductance comprises three inductors connected in series between the transceiver coaxial cable connectors.

8. The invention as described in claim 7 wherein one electrical conducting means is connected to the junction of two of said inductances for carrying data communication pulse signals from the transceiver transmitter to the coaxial cable and another electrical conducting means is connected to a different junction of two inductances for carrying data communication pulse signals from the coaxial cable to the transceiver receiver.

* * * * *